United States Patent [19]
Sperry et al.

[11] Patent Number: 6,003,288
[45] Date of Patent: *Dec. 21, 1999

[54] COMPACT PACKAGING DEVICE FOR FORMING FOAM FILLED CUSHIONS FOR PACKAGING PURPOSES

[75] Inventors: Charles R. Sperry, Springfield, Vt.; Laurence B. Sperry, Brookline, Mass.; Craig E. Robert, Hickory, N.C.; Michael J. Seckler, Wappingers Falls, N.Y.; Brian Kent Farison, New Milford; Abraham N. Reichental, Southbury, both of Conn.

[73] Assignee: Sealed Air Corporation, Saddle Brook, N.J.

[*] Notice: This patent is subject to a terminal disclaimer.

[21] Appl. No.: 08/514,010

[22] Filed: Aug. 11, 1995

Related U.S. Application Data

[63] Continuation of application No. 08/121,751, Sep. 15, 1993, abandoned, which is a continuation of application No. 07/843,609, Feb. 28, 1992, abandoned.

[51] Int. Cl.$^6$ ....................................... B65B 9/06
[52] U.S. Cl. ................................ 53/552; 53/551; 53/562; 53/371.4; 53/374.4
[58] Field of Search ........................... 493/208; 156/553; 53/371.4, 374.4, 451, 452, 455, 459, 551, 552, 562

[56] References Cited

U.S. PATENT DOCUMENTS

| | | |
|---|---|---|
| 3,087,040 | 4/1963 | VanDer Meulen . |
| 3,156,425 | 11/1964 | Mynchenberg . |
| 3,253,122 | 5/1966 | Kochmer et al. . |
| 3,267,822 | 8/1966 | Harrison . |
| 3,269,278 | 8/1966 | Olstad . |
| 3,393,291 | 7/1968 | Tucker . |
| 3,486,290 | 12/1969 | Pretzer . |
| 3,553,059 | 1/1971 | Stohlquist . |
| 3,596,428 | 8/1971 | Young et al. . |
| 3,601,328 | 8/1971 | McClung . |
| 4,094,125 | 6/1978 | Gess . |
| 4,115,182 | 9/1978 | Wildmoser . |
| 4,171,781 | 10/1979 | Kral et al. . |
| 4,213,031 | 7/1980 | Farber . |
| 4,235,064 | 11/1980 | Wenger . |
| 4,376,365 | 3/1983 | Moertel . |
| 4,383,656 | 5/1983 | Campbell . |
| 4,573,955 | 3/1986 | Mory et al. . |
| 4,631,905 | 12/1986 | Maloney . |
| 4,674,268 | 6/1987 | Gavronsky et al. . |
| 4,800,708 | 1/1989 | Sperry . |
| 4,854,109 | 8/1989 | Pinarer et al. . |
| 4,999,975 | 3/1991 | Willden et al. . |
| 5,027,583 | 7/1991 | Chelak . |

FOREIGN PATENT DOCUMENTS

| | | |
|---|---|---|
| 0 316 850 | 11/1988 | European Pat. Off. . |
| 0 534 457 | 9/1992 | European Pat. Off. . |

*Primary Examiner*—Daniel B. Moon
*Attorney, Agent, or Firm*—Alston & Bird LLP

[57] ABSTRACT

A packaging device is disclosed for forming packaging cushions of the type that include a plastic bag filled with a solid foam, and wherein the cushions are initially formed of a plastic bag filled with a foamable material that reacts and then hardens to form solid foam. The device comprises means for advancing a sheet of plastic film material that has been center-folded to form a doubled web with one closed edge defined by the center fold and one open edge defined by the adjacent edges of the sheet. Means are included for injecting a foamable composition into the center-folded web between the two folded portions of the sheet, as are means for forming a substantially linear seal along the open edge and substantially parallel to the open edge to thereby longitudinally seal the open edge of the web. The invention further includes means for periodically interrupting the linear seal to provide an unsealed portion along the otherwise sealed edge, and means for transversely sealing the web after foamable composition has been injected, and for concurrently separating a formed and filled bag from the advanced film material.

7 Claims, 4 Drawing Sheets

COMPACT PACKAGING DEVICE FOR FORMING FOAM FILLED CUSHIONS FOR PACKAGING PURPOSES

This application is a continuation of application Ser. No 08/121,751 filed Sep. 15, 1993, now abandoned which in turn is a continuation of Ser. No. 07/843,609 filed Feb. 28, 1992 now abandoned.

FIELD OF THE INVENTION

This invention relates to cushioned packaging apparatus and techniques and, in particular, relates to a compact device for forming foam cushions of the type in which a foamable composition is added to a bag while the bag is being made and wherein the foamable composition generates gases while hardening so that the result is a plastic bag filled with hardened foam.

BACKGROUND OF THE INVENTION

The present invention is related to foam-in-place packaging. Foam-in-place packaging is a useful alternative to packaging fragile or other items with loose, friable or dunnage-type materials. As known to those familiar with the packaging arts, there are a number of techniques for packaging fragile articles, most of which have associated advantages and disadvantages.

One advantageous method of easily packaging uniquely shaped items that may not otherwise be packaged in generally rectangular shipping containers, such as cardboard boxes, is referred to as foam-in-place packaging. In its overall application, a foam-in-place packaging system is one in which an item to be cushioned is placed into a container, such as a cardboard box, and then a foamable composition is added to the container. Typical foamable compositions include urethane precursors which, when mixed, generate polyurethane, carbon dioxide, and water vapor. As the urethane forms and hardens, these gases are concurrently generated so that by the time the urethane sets (generally a relatively short period of a few minutes or less) it takes the form of a polymer foam that has expanded to fill the void spaces in the container and to thereby cushion the item being packaged.

In many packaging applications, however, the item being packaged may not be able to tolerate direct contact with either the foam precursors or the foam itself. Furthermore, because the foaming, hardening polymer will tend to expand into all open spaces, some of it may become lodged in undesirable portions of the item being packaged.

Therefore, an early method of foam-in-place packaging included wrapping an item in plastic film prior to addition of the foamable composition. The plastic film protected the items from direct contact with the foamable composition, but was flexible enough so that the foamable composition could still expand and occupy the majority of void space in the container and thereby provide the desired custom-shaped cushion.

In many situations, however, the use of plastic-wrapped items still require that the plastic be placed over the item by hand, and the foam be hand injected by an operator controlling a nozzle connected to a supply of the foam precursors.

Therefore, the need was recognized and addressed to provide a more automated system of foam-in-place packaging. The results have been generally successful and include various devices, including a number assigned to the assignee of the present application. These include the device and method taught in U.S. Pat. No. 4,674,268 to Gavronski, No. 4,800,708 to Sperry, and No. 4,854,109 to Pinarer. Each of these patents disclosed a method of producing a plastic bag that was concurrently filled with a foamable composition. Such a bag can be immediately dropped into a packaging carton as the foamable composition begins to create the foamed polymer. Because the foam and the foamable composition is trapped in the bag, contact with the items being packaged is nicely avoided. At the same time, the only manual operation required—indeed if any—is to place such bags in appropriate containers with items to be cushioned.

Based on the success of these devices, newer devices have been developed which produce generally similar bags, but at greatly increased speed and efficiency. One such recent development is set forth in copending application Ser. No. 07/766,810, filed Sep. 26, 1991, now U.S. Pat. No. 5,376, 219 to Sperry et al. for "High Speed Apparatus For Forming Foam Cushions For Packaging Purposes." The contents of this application are incorporated entirely herein by reference.

The device set forth in the '810 application is, however, most useful for large scale, high volume packaging operations, and its advantages and suitability for such are appropriate set forth in the '810 application. There are a number of situations, however, where the particular end user does not require the ability to produce large numbers of foam-in-place cushions on a constant basis, but would still appreciate the opportunity to take advantage of the desirable features of foam-in-place packaging. To date, all such foam-in-place packaging apparatus have been fairly large and somewhat sophisticated. Therefore, there exists the need for a straightforward, serviceable, compact and efficient device for forming foam-in-place cushions on either a continuous or intermittent basis, and of which those requiring such services can take maximum advantage.

OBJECTION AND SUMMARY OF THE INVENTION

Therefore, it is an object of the present invention to provide a compact, efficient, and relatively high speed foam-in-place packaging device that can operate in standalone fashion, but which offers many or all of the same advantages to the end-user of more moderate need as do earlier devices for those of more demanding need. The invention meets this object by providing a packaging device for forming packaging cushions of the type that include a plastic bag filled with a solid foam, and wherein the cushions are initially formed of a plastic bag filled with a foamable material that reacts and then hardens to form solid foam. The invention includes means for advancing a sheet of plastic film material that has been center folded to form a doubled web with one closed edge defined by the center fold, and one open edge defined by the adjacent edges of the sheet. Means are included for injecting a foamable composition into the center-folded web between the two folded portions of the sheet, as are means for forming a substantial linear seal along the open edge and substantially parallel to the open edge to thereby longitudinally seal it. The invention further includes means for periodically interrupting the linear seal to provide an unsealed portion along the otherwise sealed edge and means for transversely sealing the web after foamable composition has been injected and for concurrently separating a formed and filled bag from the advanced film material.

The foregoing and other objects, advantages and features of the invention, and the manner in which the same are accomplished, will become more readily apparent upon consideration of the following detailed description of the invention taken in conjunction with the accompanying drawings, which illustrate preferred and exemplary embodiments, and wherein:

DETAILED DESCRIPTION OF A PREFERRED EMBODIMENT

Figure 1:
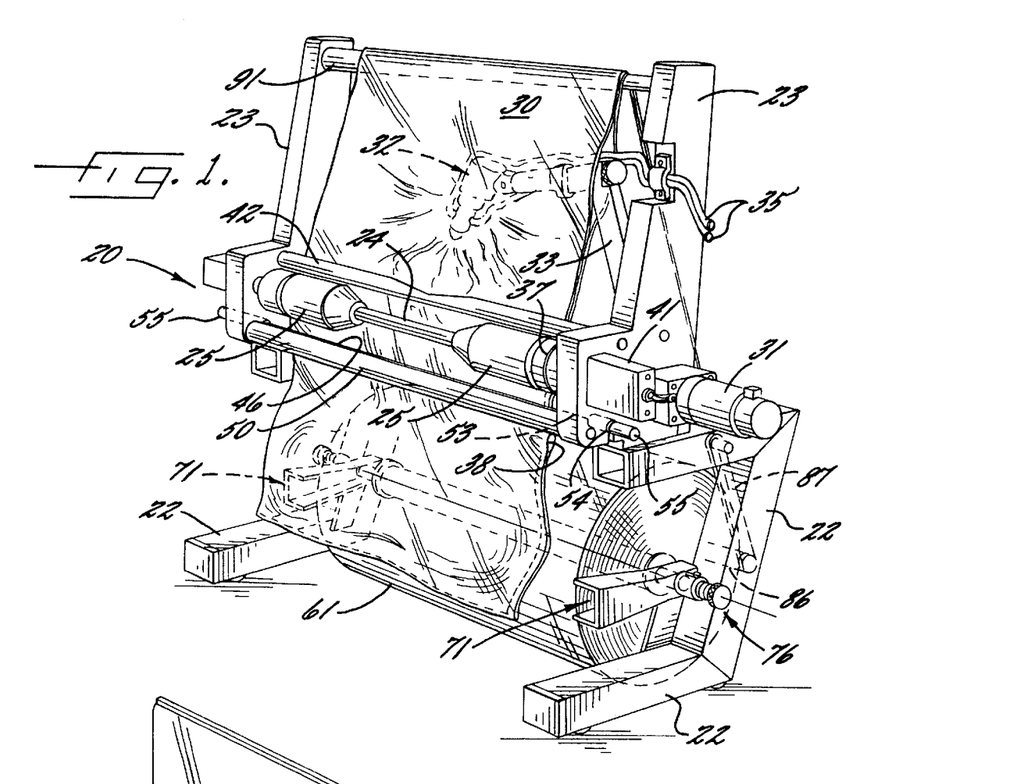
FIG. 1 is an overall perspective view of the packaging device of the present invention.
Figure 2:
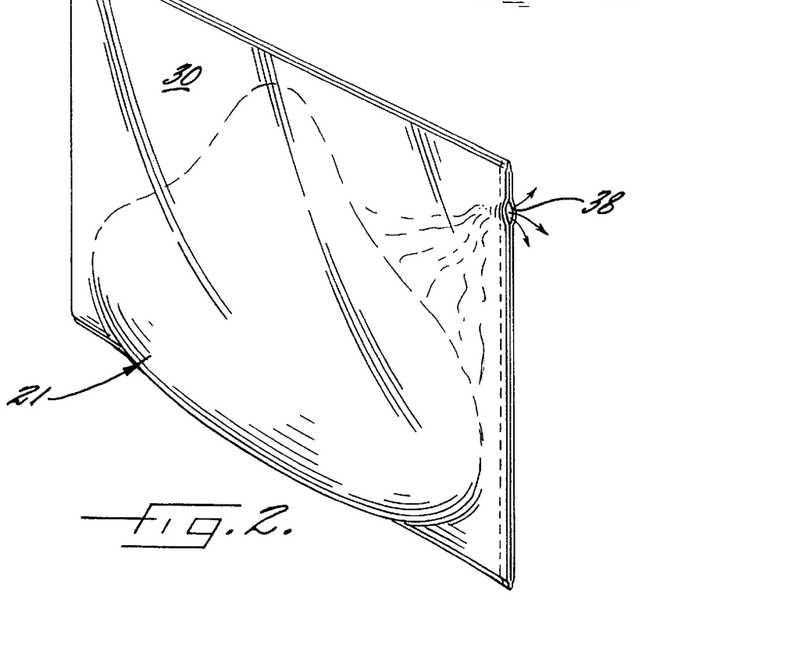
FIG. 2 is a perspective view of a bag formed by the packaging device in FIG. 1 and filled with a foamable composition.

The invention is a packaging device broadly designed at 20 in FIG. 1. As set forth herein, the device forms packaging cushions of the type that include a plastic bag filled with a solid foam and in which the cushions are initially formed of a plastic bag filled with a foamable material that reacts and then hardens to form solid foam. For purposes of description, the formed bag is broadly designated at 21 in FIG. 2. The packaging device 20 is mounted on a frame formed of opposite, identical lower portions 22, each of which has substantially horizontal and substantially vertical portions, and the mainly vertical upper portions 23. The frame portions 22,23 provide support for the remaining portions of the packaging device to be described herein.

Figures 5, 6, 7, 8:
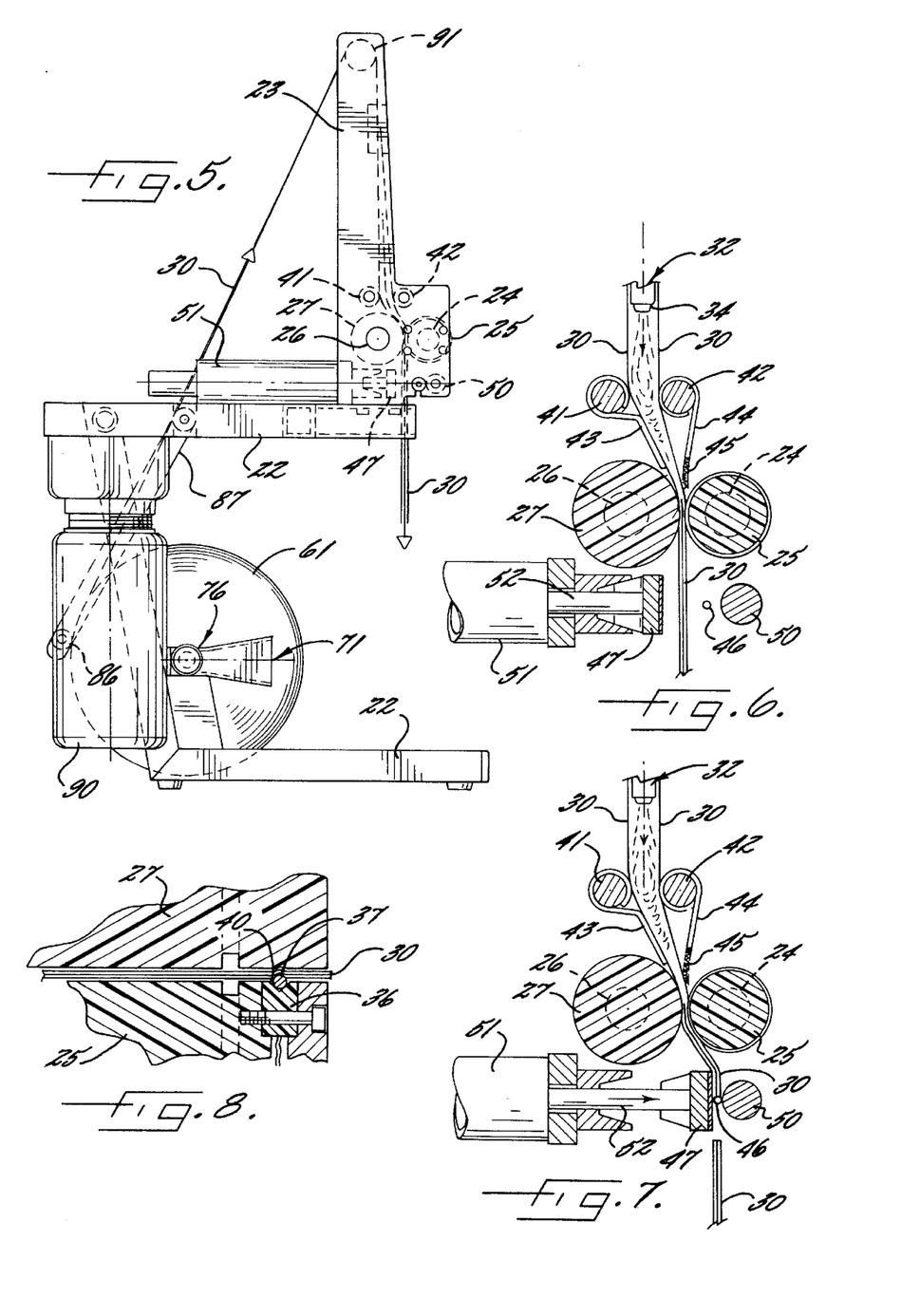
FIG. 5 is a side elevational view of the packaging device of the present invention.
FIG. 6 is a cross-sectional view taken along line 6—6 of FIG. 4.
FIG. 8 is a cross-sectional view taken along lines 8—8 of FIG. 3.
FIG. 7 is a cross-sectional view, similar to FIG. 6, except illustrating a further progressive step in the transverse sealing and severing steps.

A first element of the packaging device are the means for advancing a sheet of plastic film material that has been center-folded to form a doubled web with one closed edge defined by the center fold and one open edge defined by the adjacent edges of the sheet. The operation of the advancing means is best understood with reference to FIGS. 1, 6, and 7. FIG. 6 is a cross-sectional view which shows two opposing sets of rollers. As illustrated by a series of dotted lines in FIG. 6, the advancing means first comprises a first rotatable shaft 24 that carries a polymeric cylinder thereon, to be described later herein, as well as a pair of driven rollers, each designated at 25 in FIGS. 5, 6 and 7. It will be understood that because FIG. 1, for example, is illustrated with a bag being formed, the rollers 25 are not visible in the overall perspective view.

Figure 3:
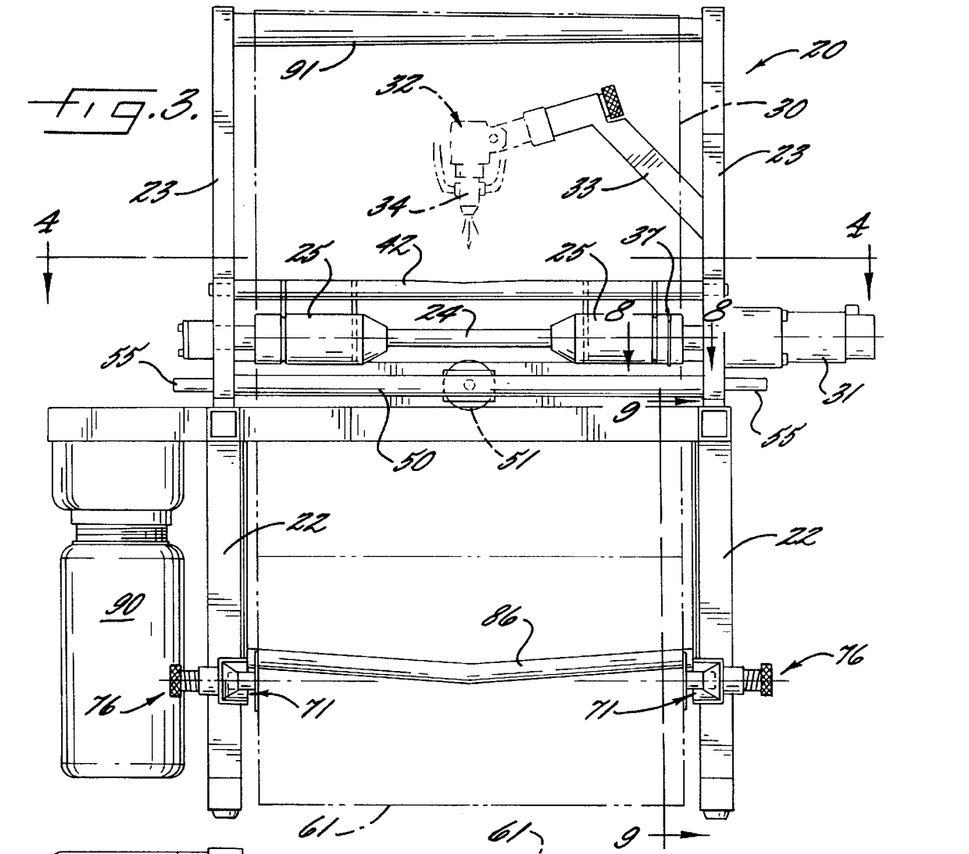
FIG. 3 is a front elevational view of the packaging device of the present invention.
Figure 4:
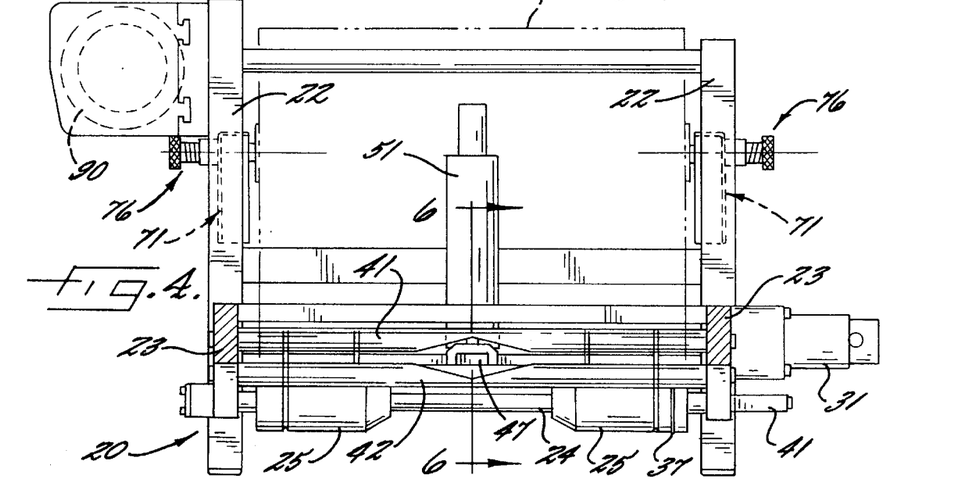
FIG. 4 is a top cross-sectional view taken along lines 4—4 of FIG. 3.

The advancement means further comprises a second rotatable shaft 26 which is more clearly illustrated in FIG. 1, FIG. 3 and FIG. 4. The second rotatable shaft carries a pair of drive rollers 27 that are also illustrated in FIGS. 1, 3, 4, 6, and 7. The first and second shafts 24, 26 are positioned sufficiently closely so that rotation of the drive rollers 27 drive the rotation of the driven rollers 25 independently of the presence or absence of plastic film material, illustrated throughout the drawings at 30, between the drive rollers 27 and the driven rollers 25. In a preferred embodiment, the drive rollers 27 are formed of a polymer, such as RTV silicone rubber and are, in turn, driven by an appropriate electric motor illustrated in the drawings at 31.

The packaging device of the present invention also includes means for injecting a foamable composition into the center folded web between the two folded portions of the sheet. The injecting means are broadly designated at 32 in the various drawings and are best illustrated in FIG. 3. As seen therein, in preferred embodiments, a bracket 33 is mounted on one of the upright frame members 23 and carries an injection nozzle 34 thereon. Such injection nozzles are described in a number of prior U.S. patents assigned to the assignee of the present invention, and in copending application Ser. No. 07/730,708 to Bertram et al. for "Improved Cartridge Port Design for Dispensing Foam Precursors" now U.S. Pat. No. 5,186,905 and assigned to the assignee of the present invention. The '708 application is, likewise, incorporated entirely herein by reference, and the injection means will not be further described other than is necessary to describe the overall operation of device. It will be seen in FIG. 1, however, that the injection means 32 are appropriately fed with foamable precursors through the hoses 35 illustrated in FIG. 1.

One of the advantages of the present invention is the use of the center-folded web material. As can be noted by a comparison of the packaging device 20 of the present invention with those in the prior art and the copending application, several of the other devices form bags from separate opposing sheets of plastic film material. Such use of opposing sheets has its advantages but does require two film supply sources. By incorporating a center-folded plastic film material, the present invention needs only one supply, a factor which permits it to have its compact profile and overall size.

The packaging device of the invention further comprises means for forming a substantially linear seal along the opened edge of the web and substantially parallel to that open edge to thereby longitudinally seal the open edge of the web. The linear sealing means are essentially identical to that set forth in the copending '810 application, but will be briefly described again herein.

As illustrated in cross-section FIG. 8, the linear seal forming means comprises a rotatable cylinder 36 that is carried coaxially with the driven rollers 25 on the first rotatable shaft 24. The rotatable cylinder 36 is positioned to bear against plastic film material 30 and is preferably formed of a thermally conductive polymeric material for dissipating heat quickly therefrom. A sealing wire 37 formed of an electrically conductive material is wrapped around the circumference of the polymeric cylinder 36 and, means are included for raising the temperature of the sealing wire 37 to a heated temperature that will seal plastic film material so that when the plastic film material 30 passes against the cylinder 36, the heated wire 37 seals it.

The advantages of the rotatable cylinder 36 and the heated wire 37 are fully set forth in the '810 application, but their predominant features can be briefly described as follows. In prior devices, the longitudinal sealing was accomplished by placing heated metal rollers in contact with the plastic film. In order to avoid sealing the plastic film, for example when the machine was stopped or when a vent opening (as described later herein) was to be formed, the metal sealing rollers had to be physically moved out of contact with the plastic film. When sealing was to be resumed, the rollers had to be repositioned against the plastic film. The time periods required to mechanically move the heated rollers limited the overall speed of the device, and the mechanisms required to reciprocate the rollers added to the overall complexity of the device.

In contrast, by using the heat dissipating cylinder 36 and the heated wire 37, the film can either be sealed or left unsealed by simply providing current to, or withholding current from, the wire 37. Being formed in an appropriate conductive metal, the wire will heat quickly, and thus respond quickly to the application of current. Similarly, because the cylinder 36 is formed of a thermally conductive material, when sealing is undesired it will quickly draw heat away from the wire to prevent sealing. As a result, because the movement of longitudinal sealing mechanism is limited to rotation in place and in constant contact with the plastic film material 30, the speed of the device is greatly increased.

As set forth in the '810 application, but not otherwise repetitively illustrated herein, the polymeric cylinders 36 include a groove 40 (FIG. 8) in the circumference thereof for receiving the sealing wire 37 therein. A spring (not shown) at either end of the sealing wire 37 applies a bias to the wire that maintains it in the groove during expansion and contraction of the wire as its temperature increases and decreases. The groove 40 further includes a spring receiving recess (not shown) for keeping the spring out of contact with plastic film material during sealing. Respective pins (not shown) in the recess attach the springs in place so that the bias of the springs helps maintain the wire in the groove 40 and on the cylinder 36. It will be understood that a resistance heating wire, such as 37, will expand and contract slightly during operation, and thus the springs provide an appropriate moderating influence that help keep the wire 37 in place. The sealing wire 37, the springs, and the pins are formed of electrically conductive materials so that a voltage applied to the pins will be correspondingly applied to the wire to heat the wire as the applied voltage generates a current therethrough.

In a preferred embodiment, the packaging device further comprises means shown as the controller 41 for maintaining an idling voltage in the sealing wire that keeps the wire at a temperature below that at which plastic will seal, but which allows the wire to more quickly reach a sealing temperature upon command. The idling voltage reduces the time required for the wire to change from a sealing to a non-sealing mode. Furthermore, by reducing the wire's temperature changes, the idling voltage likewise reduces the extent and consequences of the wire's thermal excursions. Although not illustrated in the drawings, in the preferred embodiment the wire 37 is wrapped in a slight spiral pattern around the polymeric cylinder 36. Likewise, in preferred embodiments, the polymeric cylinder further comprises a temperature sensor for monitoring the temperature of the wire. The combination of the application of an idling voltage to the wire 37 and the heat dissipation properties of the polymeric cylinder 36 enhance the ability of the wire to move from a sealing to a non-sealing mode quickly, thus increasing the overall speed with which the packaging device can operate.

FIGS. 6 and 7 further illustrate some combined features of the advancing means and the longitudinal sealing means. First, the packaging device 20 further comprises a pair of film guides 41,42 above the first and second shafts 24,26 for receiving the plastic film 30 therebetween so that the plastic film 30 is more efficiently presented to the drive rollers 27 and the driven rollers 25. The film guides 41,42 comprises adjacent bars, as perhaps best illustrated in FIG. 4. The bars 41,42 are parallel to the first and second shafts 24,26 and are positioned laterally away from the position at which the drive rollers 27 and driven rollers 25 meet in a direction toward the drive rollers. The bars 41,42 define a substantially parallelogram-shaped opening at their center portions. The bars 41,42 thereby encourage the plastic film material 30 to meet the drive rollers 27 prior to meeting the driven rollers 25 to in turn more effectively drive the advancing plastic film material 30. It has been discovered in operation that this arrangement greatly enhances the overall advancement steps of the invention.

As further shown in FIGS. 6 and 7, the film guide bars 41,42 further comprise a plurality of downwardly depending guide canes 43,44. The guide canes 43,44 further direct the advancing plastic film 30 between the drive rollers 27 and the driven rollers 25 and help prevent the plastic film 30 from wrapping around either of the first or second shafts as it advances downwardly. As illustrated in FIGS. 5 and 6, some of the guide canes, those illustrated at 44 in this embodiment, have flexible lower portions 45 which help prevent advancing plastic film 30 from tearing as it moves past.

As another detail not otherwise illustrated in this application, but clearly set forth in the incorporated '810 application, the sealing roller system further comprises a plurality of electrical contact rings on one terminal end of the first shaft and in respective electrical contact with the pins and the wires for making electrical contact with a source of electricity and for providing a path for electrical current to flow from a source to the wires to thereby heat the wires to the temperature required to seal plastic film material.

The packaging device 20 of the present invention further comprises means for periodically interrupting the linear seal to provide an unsealed portion along the otherwise sealed edge. As stated earlier herein, the hardened, solid foam is the result of a chemical reaction which produces the eventually solid polymer while currently generating water vapor and carbon dioxide. The carbon dioxide and water vapor desirably form the foam as they escape from the forming polymer. Nevertheless, if the foamable composition were placed in an entirely sealed bag, the volume of gas generated would soon build up sufficient pressure to rupture the bag before the foam had hardened. Such a rupture should, of course, defeat the purpose of using the bag to contain the polymer. Thus, in order to preserve the bag's usefulness, the gases must be permitted to escape in an appropriate manner. One method for appropriately venting the bag is to provide a small, unsealed opening along one edge of the bag. As noted above, in earlier generations of foam-in-place packaging devices, such openings were formed by physically moving the heated sealing rollers into and out of contact with the plastic film material. As just described, however, in the present invention a small, unsealed portion is provided by simply turning down the current to the heating wire 37 so that the wire's temperature drops just below that at which the plastic will become sealed. After a short period of time, the current to the wire 37 is again raised to raise the temperature to that which will seal plastic. The result is that a period of time is established during which the advancing film material 30 is left unsealed. The result, in turn, is a small unsealed opening illustrated at 38 in the side of a finished bag.

Thus, the polymeric cylinder 36 and heated wire 37 described herein provide means for interrupting the linear seal once between each respective transverse seal and the next respective transverse seal to thereby produce bags with one opening in one side edge thereof for venting the gases produced as the foamable composition foams. As further just described, the periodic interrupting means further can interrupt the linear seal while the web is continuously advancing. The interruption is for a time period that represents a small fraction of the time required to seal the open edge between transverse seals. As a result, the opening represents a proportionally small fraction of the length of the overall seal to thereby provide a vent opening large enough for gases to escape, but small enough to substantially prevent foam from escaping from the formed and filled bag.

The packaging device 20 further includes means for transversely sealing the web after foamable composition has been injected and for concurrently separating a formed and filled bag from the advancing foam material. The transverse sealing means is perhaps best illustrated in FIGS. 6 and 7 and first comprises a cross-cut wire 46 positioned substantially perpendicularly to the respective folded and opened edges of plastic film material 30 advanced by the advancing means. The cross-cut wire severs plastic in contact with the wire 46 when the wire 46 is heated to a temperature that will seal and sever plastic. The wire is formed of an appropriate metal that will become heated when an electrical current is applied. Accordingly, any appropriate means of applying a current will serve as means for heating the wire to a temperature that will sever the plastic film material. Such resistance heating and the temperatures required to seal plastic are well-known to those of ordinary skill in the art and need not otherwise be described, nor do they require undue experimentation to accomplish.

A flexible sealing actuator bar 47 is positioned parallel to the wire. A flexible sealing roller 50 is positioned parallel to the wire 46 and parallel to the actuator bar 47, but on the opposite side of the wire 46 from the bar 47. The advancing means described earlier feeds plastic film material between the wire 46 and the flexible sealing roller 50. A driver illustrated as the two-coil solenoid 51 and its shaft 52 drive the bar 47 against the wire 46 and the wire against the sealing roller 50 to thereby seal and sever plastic film material 30 passing between the sealing wire 46 and the sealing roller 50. As just noted, the driver for the actuator bar 47 is a two-coil solenoid 51 which preferably drives the actuator bar in opposite directions as desired.

In a preferred embodiment, the means for heating the wire 46 further comprises means for preventing the wire from heating until the actuator bar is in contact with the flexible sealing roller. This is a safety feature described in the '810 copending application which prevents the sealing wire from reaching a temperature that would injure an operator if the operator, for some reason, had their hand in the vicinity of the wire when the packaging device 20 was about to form a transverse seal. The cross-cut wire 46 further comprises a respective at each opposite end thereof for mounting the cross-cut wire 46 against the springs' tension. The position of the springs is illustrated by the dotted lines at 53 in FIG. 1, and the device further includes means shown as the slots 54 and the knobs 55 for receiving the springs in the upright frame members 23 so that the sealing wire 46 can be positioned and maintained in position in the absence of other attachment. The springs also help maintain the wire 46 taut during the expansion and contraction that accompany its thermal excursions.

Although not illustrated in detail because of the small scale involved, the cross-cut wire 46 further comprises double-wrapped terminal portions for reducing the electrical resistance of the wire at its respective terminal portions. Furthermore, as was the case with the sealing wire 37, the invention further comprises means for maintaining the sealing wire 46 at an idling temperature that is above ambient temperature, but below the temperature at which sealing takes place. The idling temperature provides for more rapidly raising the sealing wire 46 to sealing temperatures whenever desired and reduces the extent and consequences of the thermal excursions of the wire.

Figure 9:
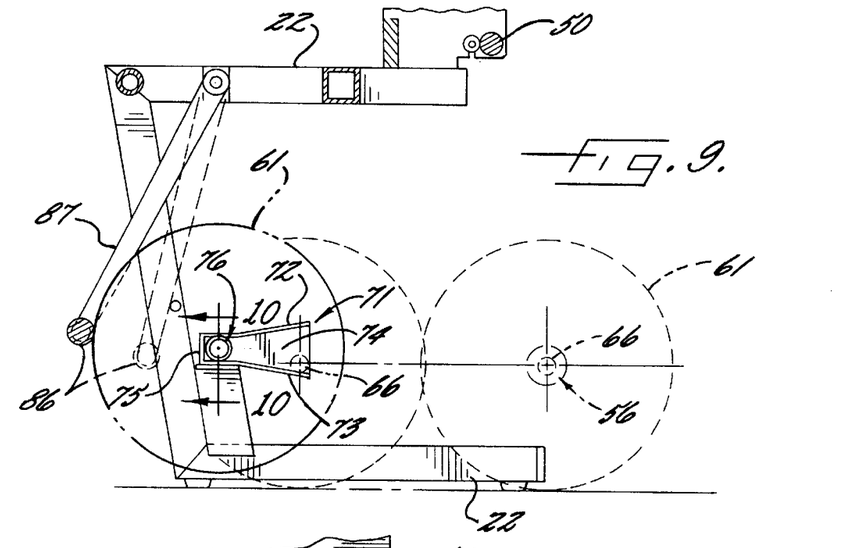
FIG. 9 is a cross-sectional view taken along lines 9—9 of FIG. 3.
Figure 10:
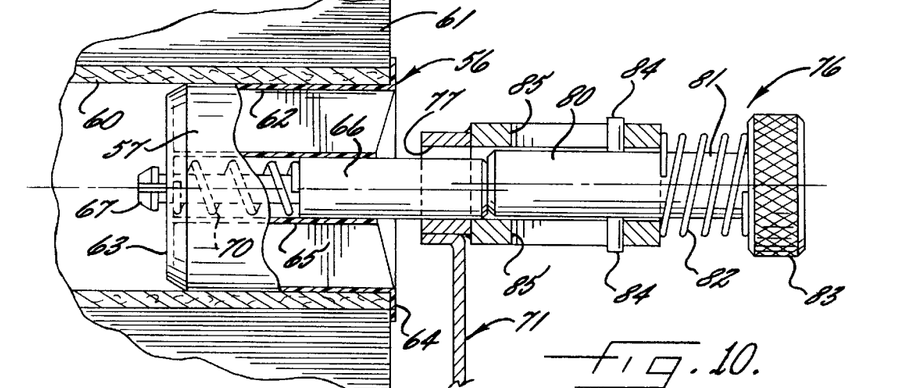
FIG. 10 is a cross-sectional view taken along lines 10—10 of FIG. 9.
Figure 11:
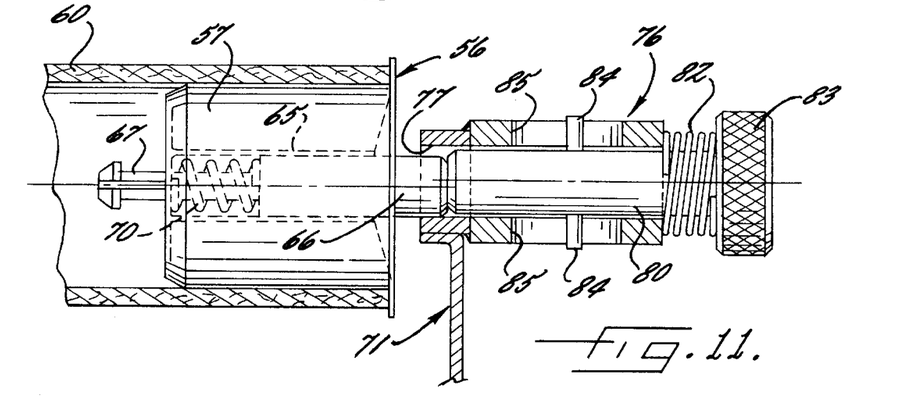
FIG. 11 is a cross-sectional view similar to FIG. 10 but showing a different stage of operation of the mechanism.

The packaging device 20 of the present invention further comprises means for realeasably carrying a stock supply roll of center-folded plastic film material. In a preferred embodiment, the carrying means comprises means for retaining and releasing a telescoping core plug inserted in the end of a core of a role of web material. Aspects of this are best illustrated in FIGS. 9, 10, and 11. Furthermore, the telescoping core plug and the means for retaining and releasing it are also further described in copending application Ser. No. 07/843,722, filed concurrently herewith, to Robert, et al. for "Telescoping Core Plug and Support Therefor," now U.S. Pat. No. 5,322,234 the contents of which are incorporated entirely herein by reference. Such a telescoping core plug is broadly designated at 56 in FIGS. 10 and 11. The core plug 56 comprises a generally cylindrical body 57 which has a diameter which corresponds substantially to the internal diameter of a core 60 of a supply roll 61 of plastic film material. The cylindrical body 57 can be a substantially hollow, cup-shaped body open at its outer end formed by a circumferential side wall 62 and an end wall 63 at its closed end. Preferably, an annular flange 64 surrounds the circumferential side wall 62 at its open end and serves to keep the core plug 56 from being inserted too far into the core 60 of the supply roll 61.

The cylindrical body portion 57 further includes a hub portion 65 which defines an axial opening of predetermined diameter extending longitudinally throughout the cylindrical body 57. In preferred embodiments, the hub portion 65 is formed integrally with the end wall 63 and extends entirely through to the outer end of the cylindrical body portion.

The core plug 56 further includes a spindle member defined by supporting portion 66 and an inward end portion 67. The spindle member formed by these two portions is telescopically mounted in the axial opening formed by the hub 65 for movement between extended and retracted positions. The end portion 67 projects beyond the outer end of the body portion 57 and preferably has a diameter closely conforming to the predetermined diameter of the axial opening for a snug fit therein while still permitting relative movement. In its extended position, the supporting end portion 66 may be received in a roll support to be described herein when the core plug 56 is placed within the end of the core 60 for supporting one end of the roll as film is advanced throughout the packaging device 20. The inward end 67 extends through the axial opening defined by the hub 65 in the end wall 63 and has a smaller diameter than the supporting end portion 66 in order to accommodate the spring 70. As illustrated in FIGS. 10 and 11, the spring 70 biases the spindle support 66 and the inward end portion 67 towards a position extended from one another, as best illustrated in FIG. 10.

The supporting end portion 66 can be received in a roll support, to be described herein, when the cylindrical body 57 of the core plug 56 is placed into the core 60 of a roll of web material 61.

Thus, in the packaging device 20, the carrying means for the stock supply roll 61 of center-folded plastic film material first comprises a core plug receiving chute broadly designated in the drawings as 71. The chute has a top member 72, a bottom member 73, a back member 74, and a rear member 75, which together define a channel for receiving a core plug such as 56.

The chute 71 has a seating member broadly designated at 76 and best illustrated in FIGS. 10 and 11. The seating member 76 has an axial opening 77 of predetermined diameter extending longitudinally through the seating member 76 and the back member 74 of the chute, the axial opening being of a size sufficient to receive the appropriate portions of the core plug 56.

A plunger 80 is telescopically mounted in the axial opening 77 in the seating member 76 for movement between extended and retracted positions. The plunger 80 includes an end portion 81 that projects beyond the outer end of the seating member 76. A spring means illustrated as the spring 82 biases the plunger 80 towards its extended position by bearing against the knob 83. In order to maintain the plunger 80 within the axial opening 77, however, the plunger 80 is connected to a pair of pins 84 extending radially therefrom which are free to move within defined openings 85 in the seating member 76.

The telescoping core plug 56 and the seating member 76 compliment one another in operation. As illustrated in FIG. 9, a roll 61 of plastic film material can be advanced towards the chute 71. Preferably, the channel defined by the chute is wider from top to bottom at its receiving end than it is at the end carrying the seating member 76. Thus, as illustrated in FIG. 9, the supporting end 66 of the core plug 56 can engage the chute and be directed towards the seating member 76 as the entire roll 61 is moved towards the rear of the chute 71. When the spindle support end 66 of the core plug 56 is first introduced into the chute, it will be seen that the spindle support end 66 can be pushed inwardly with respect to the overall core plug 56 to allow it to travel in the chute 71. When the entire roll 61 reaches the rear of the seating member 76, the spring 70 biases the spindle support end 66 outwardly and into the axial opening 77 in the seating member 76. Similarly, because the plunger 80 in the seating member 76 is likewise biased in the same overall direction, the net result is that the telescoping core plug 56 pops into place in the seating member 76 and is maintained satisfactory therein by the spindle support ends 66 biased by the spring 70.

Alternatively, when the roll 61 empties and must be replaced, the transition can be made rather easily simply by pushing against knob 83 to move plunger 80 inwardly against spindle support 66, as perhaps best illustrated in FIG. 11. When the plunger 80 is pushed inwardly far enough it similarly pushes the spindle support end 66 inwardly sufficiently for the core plug 56 to completely release from the seating member 76, which in turn permits the entire roll core 60 to be removed and replaced with a new one.

In its preferred embodiments, the packaging device 20 of the present invention further comprises means for applying tension to the web 30 parallel to its direction of advancement to thereby enhance the presentation of the advancing web for sealing the open edge and forming a transverse seal. As illustrated in the drawings, in a preferred embodiment, the tension applying means comprises a roller 86 adjacent the portions of the packaging device 20 that carry the chute 71 and seating member 76. The roller 86 bears against a supply roll 61 in the seating means 76 and rotates opposite to the supply roll 61 to partially retard the rotation of the supply roll 61 and thereby apply tension to the web 30 being advanced. As best illustrated in FIGS. 5 and 9, the roller 86 is carried by a pair of arms 87 that depend from, and are pivotably mounted on, the lower frame 22. It will be seen that the combination of the pivoting arm 87 and the weight of the roller 86 applies a force against a supply roll 61 positioned in the seating means 76 and thus provides a simple, yet effective, means of applying tension to the advancing web.

A number of other items are illustrated in the various figures. FIGS. 3 and 4 illustrate that the packaging device 20 of the present invention can also include a supply bottle 90 for carrying a solvent. As described in a number of the aforementioned applications which relate to foam injection cartridges, a useful attribute of such cartridges is that they be washed with a cleaning solvent to avoid a build-up of hardened foam on the injection cartridge 32. Incorporating the solvent supply on the lower frame portions 22 of the packaging device 20 provides an advantageous accessory without otherwise complicating the operation of the packaging device 20 or overly increasing footprint. An appropriate solvent system is described in copending application Ser. No. 07/767,033 filed Sep. 26, 1991 by Spring, et al. for "Improved Pumping and Cleaning System for Foam in Place Injection Cartridges," now U.S. Pat. No. 5,255,847 the contents of which are incorporated entirely herein by reference.

FIGS. 1 and 3 and 5 also illustrate a preferred path of travel for the plastic film 30 from the supply roll 61 to the injection means 32 and the respective sealing means. As illustrated in FIG. 5, the plastic film 30 advances from the supply roll 61 upwardly to an idler roll 91 and then downwardly toward the injection means 32.

Similarly, there are a number of individual elements which make up the lower frame 22 and the upper frame 23 that have not been specifically recited as their function and position are such that they can be straightforwardly comprehended from the drawings and are not specific to or limiting of the invention other than in providing the overall framework required.

In the drawings and specification, there have been disclosed typical preferred embodiments of the invention and, although specific terms have been employed, they have been used in a generic and descriptive sense only and not for purposes of limitation, the scope of the invention being set forth in the following claims.

That which is claimed is:

1. A packaging device for forming packaging cushions of the type that include a plastic bag filled with a solid foam, and wherein the cushions are initially formed of a plastic bag filled with a foamable material that reacts and then hardens to form solid foam, the apparatus comprising:

means for advancing a sheet of plastic film material that has been center-folded to form a doubled web with one closed edge defined by the center fold and one open edge defined by the adjacent edges of the sheet;

means for injecting a foamable composition into the center-folded web between the two folded portions of the sheet;

means for forming a substantially linear seal along the open edge and substantially parallel to the open edge to thereby longitudinally seal the open edge of the web;

means for periodically interrupting the linear seal to provide an unsealed portion along the otherwise sealed edge;

a crosscut wire for transversely sealing the web after foamable composition has been injected, and for concurrently separating a formed and filled bag from the advanced film material, said crosscut wire being positioned substantially perpendicularly to the position of plastic film material advanced by said advancing means for severing plastic in contact with said wire when said wire is heated to a temperature that will seal and sever plastic;

means for heating said wire to a temperature that will sever plastic film material;

a flexible sealing actuator bar parallel to said wire;

a flexible sealing roller parallel to said wire and said bar, and on the opposite side of said wire from said bar; and a driver in operative connection to said actuator bar for driving said bar against said wire and said wire against said sealing roller to thereby seal and sever plastic film material passing between said sealing wire and said sealing roller.

2. A packaging device according to claim 1 wherein said driver is a two coil solenoid for driving said actuator bar in opposite directions as desired.

3. A packaging device according to claim 1 wherein said means for heating said wire further comprises means for preventing said wire from heating until said actuator bar is in contact with said flexible sealing roller.

4. A packaging device according to claim 1 wherein said crosscut wire further comprises:

a respective spring at each opposite ends thereof for spring mounting said crosscut wire against the tension of said springs; and means on said apparatus for receiving said springs so that said sealing wire can be positioned and maintained in position in the absence of other attachment, and for maintaining said wire taut during expansion and contraction of said wire during its thermal excursions.

5. A packaging device according to claim 4 wherein said spring receiving means comprises:

upright frame members;

respective slots in the upright frame members for receiving the springs in the upright frame members; and respective knobs at the terminal ends of said wire so that the sealing wire can be positioned and maintained in position in the absence of other attachment.

6. A packaging device according to claim 1 wherein said crosscut wire further comprises a double wrapped portion at the terminal portions of said wire for reducing the electrical resistance of said wire at its respective terminal portions.

7. A packaging device according to claim 1 and further comprising means for maintaining said sealing wire at an idling temperature that is above ambient temperature, but below the temperature at which sealing takes place to thereby provide for more rapidly raising said sealing wire to sealing temperature whenever desired, and for reducing the extent and consequences of the thermal excursions of said wire.

* * * * *